R. A. SAEGER.
GRADOMETER.
APPLICATION FILED MAY 14, 1918.

1,348,055.

Patented July 27, 1920.
2 SHEETS—SHEET 1.

Witnesses

Inventor
R. A. Saeger,
By Victor J. Evans
Attorney

R. A. SAEGER.
GRADOMETER.
APPLICATION FILED MAY 14, 1918.

1,348,055.

Patented July 27, 1920.
2 SHEETS—SHEET 2.

Witnesses
J. H. Crawford

Inventor
R. A. Saeger,
By Victor J. Evans
Attorney

UNITED STATES PATENT OFFICE.

RAYMOND A. SAEGER, OF ANKONA, FLORIDA.

GRADOMETER.

1,348,055.        Specification of Letters Patent.        Patented July 27, 1920.

Application filed May 14, 1918. Serial No. 234,445.

*To all whom it may concern:*

Be it known that I, RAYMOND A. SAEGER, a citizen of the United States, residing at Ankona, in the county of St. Lucie and State of Florida, have invented new and useful Improvements in Gradometers, of which the following is a specification.

This invention relates to an attachment for vehicles, such as automobiles, aeroplanes and other motor driven machines, and is designed to indicate the grade over which a land craft travels or the inclination of an air craft.

The primary object of the invention is to produce a device of this character which shall be of an extremely simple construction, easily attached to any convenient part of a machine to render the same readily perceptible to the observer, and which will perform the functions for which it is designed with ease and with accuracy.

Other objects and advantages will appear as the nature of the invention is better understood, reference being had to the accompanying drawings, in which, Figure 1 is a detail fragmentary perspective view of a portion of an automobile or aeroplane having my improvement secured thereon.

Figure 1:
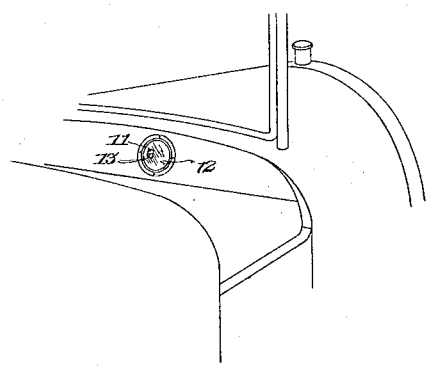
Figure 2:
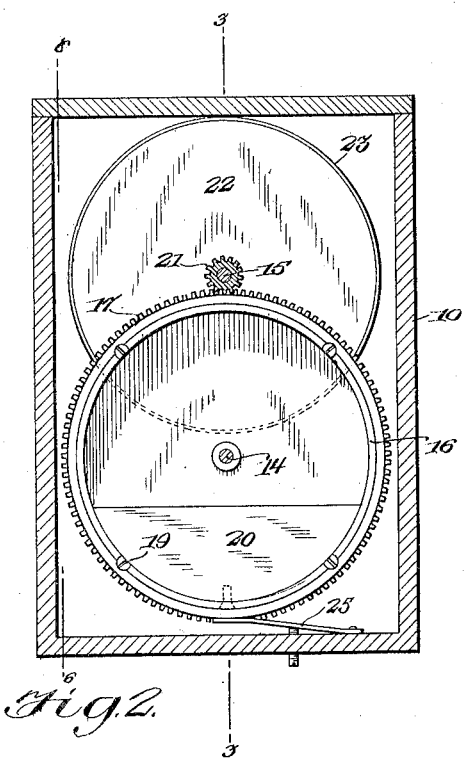
Fig. 2 is a vertical longitudinal sectional view through the casing including the improvement.
Figure 3:
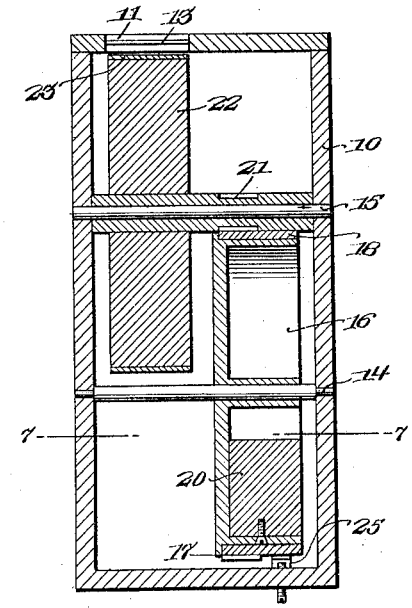
Fig. 3 is a sectional view approximately on the line 3—3 of Fig. 2.
Figure 5:
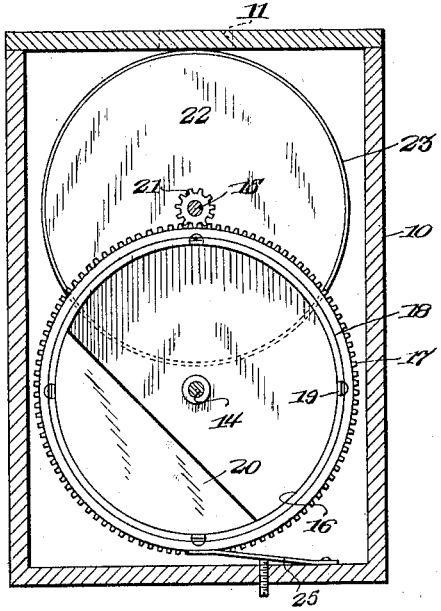
Fig. 5 is a detail sectional view illustrating the manner in which the core may be adjusted with respect to the gear ring or band.
Figure 4:
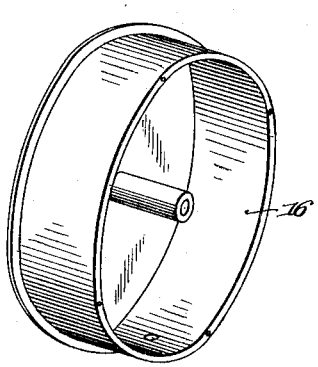
Fig. 4 is a perspective view of the gear ring and the weight carrying core therefor.
Figure 7:
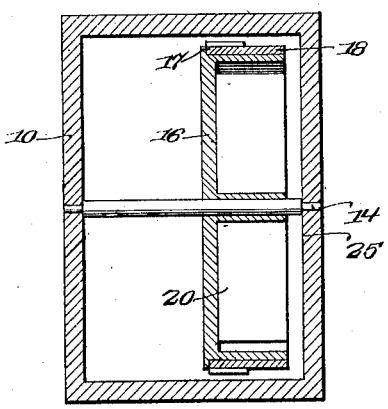
Fig. 7 is a similar sectional view approximately on the line 7—7 of Fig. 3.
Figure 6:
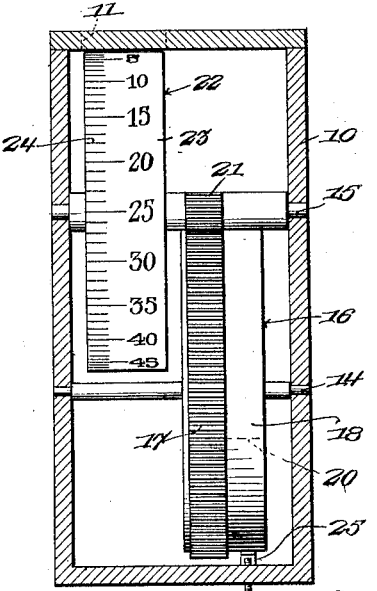
Fig. 6 is a sectional view approximately on the line 6—6 of Fig. 3.

The numeral 10 designates a suitable casing which, as illustrated in Fig. 1 of the drawings may be attached to the dash of an automobile or in a position convenient to the aviator in an air craft. The casing may be of a substantially rectangular formation as disclosed by the drawings and is provided with a sight opening 11 covered by a glass plate 12 having arranged transversely and centrally thereof an indicating bar or strip 13.

Journaled in suitable openings, preferably provided in the opposite sides of the casing is a pair of spaced shafts 14 and 15 respectively, the shaft 14 having secured thereon a wheel 16, and on the periphery of this wheel is secured a toothed band 17. The band has one of its edges provided with a nontoothed extension 18, the same being engaged by screws 19 that enter the wheel 16. The wheel 16 is in the nature of a flat disk and in reality provides a core for the cylindrical toothed band 17. The wheel 16 has peripherally secured thereon the weight 20, the said weight being in the nature of a segment as is the wheel 16. By loosening the screws 19 it will be apparent that the toothed band may be turned a determined distance around the wheel and by removing the said screws the said band may be removed from the core.

On the shaft 15 is keyed a pinion 21 which meshes with the gear provided by the band 17, and on one side of the pinion 21 is secured an indicating wheel 22, the same having on its periphery a continuous strip 23, of celluloid or the like provided with suitable graduations 24. The graduations are arranged opposite the sight opening 11 and the weighted wheel 16, normally assuming one position will turn the gear 21, when the casing 10 assumes an angle, consequently revolving the wheel 22 so that the degree marks 24 will be readily apparent to the user of the machine in which the device is installed.

The ratio between the gears 17 and 21, when the device is employed on aeroplanes where 100 per cent. grade is to be recorded, is 4 to 1 and when employed on automobiles where only 50 per cent. of the grade need be recorded, the ratio is 8 to 1. The indicator wheel, when the device is used for automobiles registers from nothing to fifty both ways around and when employed in aeroplanes registers one to one hundred both ways.

As both the indicating and operating wheels or members are liable to accidental turning on their respective shafts, I provide braking means therefor, the same being in the nature of flat springs 25 having one of their ends secured to the respective sides of the casing 10 and their other ends contacted with the sides of the respective wheels 16 and 22. Preferably the tension of these springs may be regulated so that the pressure exerted thereby on the wheels may be properly adjusted.

The wheel 16 preferably has its closed face provided with a peripheral flange 15 against which the toothed band 17 abuts, and if desired this flange or rim 15 can be extended to contact with one of the sides of the pinion 21 to hold the said pinion against longitudinal movement, on its shaft, in one direction.

The spring brake members are contacted by adjusting elements 51, the latter being preferably in the nature of headless screws having their outer ends kerfed and passing through threaded openings in the casing 10. By this arrangement, the proper frictional contact of the brake with the operating wheels may be readily accomplished.

What I claim is:

In a gradometer, two spaced shafts, a core having a round periphery and one of its faces open secured on one of said shafts, said core having a flange extending over its periphery from the closed face thereof, a toothed band arranged on the core and contacting with the flange thereof, a pinion on the second shaft meshing with the toothed band and also contacted by the flange of the core, a graduated wheel on the second shaft, a segmental weight in the core, means on the outer edge of the core contacting with the weight for holding the same in the core, a spring brake contacting with the periphery of the core and means for adjusting the pressure of said brake against said core.

In testimony whereof I affix my signature.

RAYMOND A. SAEGER.